United States Patent
Liang (10) Patent No.: US 9,606,830 B2
(45) Date of Patent: Mar. 28, 2017

(54) METHOD AND DEVICE FOR HANDLING OPTIMIZATION PROCESSES BASED ON EUCLIDEAN DISTANCE

(71) Applicant: TENCENT TECHNOLOGY (SHENZHEN) COMPANY LIMITED, Shenzhen (CN)

(72) Inventor: Xiaowen Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 15 days.

(21) Appl. No.: 14/699,236

(22) Filed: Apr. 29, 2015

(65) Prior Publication Data

US 2015/0227388 A1 Aug. 13, 2015

Related U.S. Application Data

(63) Continuation of application No. PCT/CN2013/085929, filed on Oct. 25, 2013.

(30) Foreign Application Priority Data

Oct. 30, 2012 (CN) .......................... 2012 1 0423983

(51) Int. Cl.
  *G06F 9/48* (2006.01)
  *G06Q 10/04* (2012.01)
(52) U.S. Cl.
  CPC .......... *G06F 9/4818* (2013.01); *G06F 9/4881* (2013.01); *G06Q 10/04* (2013.01); *G06F 2217/08* (2013.01)
(58) Field of Classification Search
  None
  See application file for complete search history.

(56) References Cited

U.S. PATENT DOCUMENTS 6,004,015 A * 12/1999 Watanabe ............. G06F 17/505
                                                      700/28
2005/0143845 A1* 6/2005 Kaji ................... G05B 13/0265
                                                      700/28

(Continued)

FOREIGN PATENT DOCUMENTS

CN         1988684 A      6/2007
CN     101047479 A  *  10/2007

(Continued)

OTHER PUBLICATIONS

International Search Report for International Application No. PCT/CN2013/085929, mailed on Jan. 23, 2014.

(Continued)

*Primary Examiner* — Abu Ghaffari
(74) *Attorney, Agent, or Firm* — Knobbe Martens Olson & Bear LLP (57) ABSTRACT

Examples of the present disclosure provide a method and device for handling an optimization process, which belong to computer technologies. The method includes: at least one process being executed is determined; a default category process matching with each process in the at least one process is identified, based on a default process category list, in which the default process category list includes a default category process and feature information of the default category process; based on the feature information of the default category process matching with each process in the at least one process, an optimization handling is performed on the at least one process.

8 Claims, 4 Drawing Sheets

(56) References Cited

U.S. PATENT DOCUMENTS

| | | | | |
|---|---|---|---|---|
| 2008/0195235 A1* | 8/2008 | Rund | ................ | G05B 13/021 700/33 |
| 2008/0232682 A1* | 9/2008 | Eswaran | ................ | G06K 9/628 382/159 |
| 2009/0083752 A1* | 3/2009 | Wu | ................ | G06F 9/542 718/106 |
| 2009/0208117 A1* | 8/2009 | Eichen | ................ | G06K 9/6203 382/218 |
| 2010/0057410 A1* | 3/2010 | Yanami | ................ | G06F 17/50 703/2 |
| 2010/0138026 A1* | 6/2010 | Kaushal | ................ | G05B 13/0265 700/104 |
| 2010/0249968 A1* | 9/2010 | Neuber | ................ | G06Q 10/06 700/99 |
| 2012/0095987 A1* | 4/2012 | Cheng | ................ | G06F 17/30442 707/713 |
| 2012/0185301 A1* | 7/2012 | V.K. | ................ | G06Q 10/06393 705/7.39 |
| 2013/0318351 A1* | 11/2013 | Hirano | ................ | H04L 9/3073 713/168 |
| 2015/0310155 A1* | 10/2015 | Banerjee | ................ | G06F 17/5081 716/53 |
| 2016/0070257 A1* | 3/2016 | Virtanen | ................ | G05B 13/04 700/99 |

FOREIGN PATENT DOCUMENTS

| | | |
|---|---|---|
| CN | 101133396 A | 2/2008 |
| CN | 101192169 A | 6/2008 |
| CN | 102253858 A | 11/2011 |
| CN | 102479108 A | 5/2012 |
| CN | 102609351 A | 7/2012 |

OTHER PUBLICATIONS

Office Action Issued in Chinese Patent Application No. 201210423983.0, dated Sep. 16, 2014.

International Preliminary Report for International Application No. PCT/CN2013/085929, mailed May 14, 2015, in 6 pages.

* cited by examiner

METHOD AND DEVICE FOR HANDLING OPTIMIZATION PROCESSES BASED ON EUCLIDEAN DISTANCE

CROSS-REFERENCE TO RELATED APPLICATIONS

The application is continuation of international application No. PCT/CN2013/085929, filed on Oct. 25, 2013, which claims the benefit of a Chinese patent application 201210423983.0, titled "Method and device for Handling Optimization Processes", filed on Oct. 30, 2012. The disclosures of each of the above applications are hereby incorporated herein by reference in their entireties.

BACKGROUND OF THE INVENTION

Field of the Invention

The present disclosure relates to computer technologies, and more particularly, to a method and device for handling an optimization process.

Description of the Related Art

Accompanying with development of the Internet, a terminal used by a user, e.g., a computer, may not execute only one task most of the time. For example, when a user utilizes a computer to browse a webpage or view an online video, a downloading service may also be executed. Alternatively, security software may be updated or may execute a scanning task simultaneously, and so on. Each task may correspond to one process. When a computer simultaneously handles multiple tasks, the computer may handle multiple processes simultaneously.

SUMMARY OF THE INVENTION

Examples of the present disclosure provide a method and device for handling an optimization process. The technical solutions may be as follows.

From one aspect, a method for handling an optimization process is provided, which includes: determining at least one process being executed; identifying a default category process matching with each process in the at least one process, based on a default process category list, wherein the default process category list includes a default category process and feature information of the default category process; performing optimization handling on the at least one process, based on the feature information of the default category process matching with each process in the at least one process.

From another aspect, a device for handling an optimization process is also provided, which includes a determining module, an identifying module and an optimizing module, wherein the determining module is to determine at least one process being executed; the identifying module is to identify a default category process matching with each process in the at least one process, based on a default process category list, wherein the default process category list includes a default category process and feature information of the default category process; and the optimizing module is to perform optimization handling on the at least one process, based on the feature information of the default category process matching with each process in the at least one process.

From another aspect, another device for handling an optimization process is also provided, which includes a memory, and a processor in communication with the memory, wherein the memory stores a determining instruction, an identifying instruction and an optimizing instruction, which are executable by the processor, the determining instruction indicates to determine at least one process being executed; the identifying instruction indicates to identify a default category process matching with each process in the at least one process, based on a default process category list, wherein the default process category list includes a default category process and feature information of the default category process; and the optimizing instruction indicates to perform optimization handling on the at least one process, based on the feature information of the default category process matching with each process in the at least one process.

DETAILED DESCRIPTION OF THE PREFERRED EMBODIMENT

During the process of implementing the technical solution of the present disclosure, the inventor finds that at least the following problems exist in the prior art. In the prior art, when a terminal simultaneously handles multiple tasks and executes multiple processes, the multiple processes may simultaneously occupy network bandwidth, and/or, network resources, and the terminal may not simultaneously handle the multiple tasks effectively. Thus, handling efficiency of the terminal may be lower. For example, when a user utilizes a computer to browse a webpage or view an online video, security software may be updated or may execute a scanning task, and so on. Since a large number of computer resources may be consumed, when the security software is updated, or the security software is scanning a virus, which will affect webpage browsing, or online video viewing, or executions of other tasks performed by the computer. Thus, handling efficiency of the computer may be reduced.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on"

means based at least in part on. In addition, the terms "a" and "an" are intended to denote at least one of a particular element.

A First Example

Figure 1:
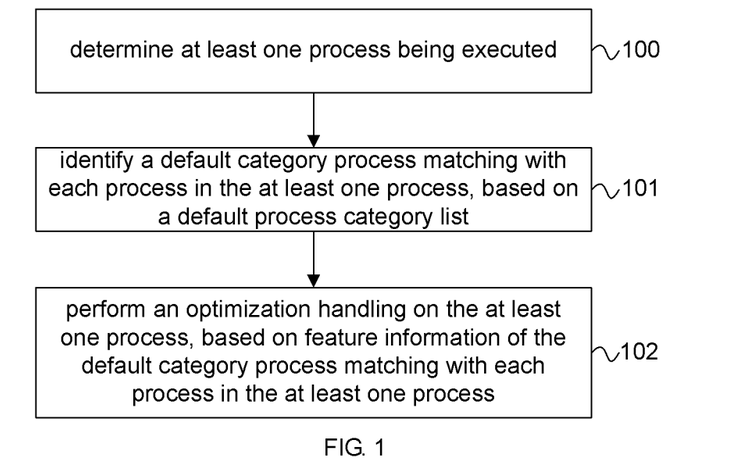
FIG. 1 is a flowchart illustrating a method for handling an optimization process, in accordance with a first example of the present disclosure.

FIG. 1 is a flowchart illustrating a method for handling an optimization process, in accordance with a first example of the present disclosure. As shown in FIG. 1, the method for handling the optimization process provided by the example may include the following blocks.

In block 100, determine at least one process being executed.

In block 101, identify a default category process matching with each process of the at least one process, based on a default process category list.

The default process category list in the example may include a default category process and feature information of the default category process. Specifically speaking, the default process category list may include a process of one default category and feature information of the default category process, or include processes of multiple default categories, and feature information of each default category process.

In block 102, perform an optimization handling on the at least one process, based on the feature information of the default category process matching with each process of the at least one process.

For example, based on the feature information of the default category process matching with each process in the at least one process, the each process in the at least one process may be understood effectively, so as to perform an optimization handling on the at least one process. For example, some processes may be handled, while the other processes may be suspended.

The method for handling an optimization process provided by the example may be applied to a device, which is to handle an optimization process. Specifically speaking, the device for handling the optimization process may be set in a terminal, e.g., a fixed terminal, such as computer, or a mobile terminal, such as a mobile phone or a tablet Personal Computer (PC).

In accordance with the method for handling an optimization process provided by the example, by determining at least one process being executed, a default category process matching with each process of the at least one process may be identified, based on the default process category list, in which the default process category list may include a default category process and feature information of the default category process; an optimization handling may be performed on the at least one process, based on the feature information of the default category process matching with each process of the at least one process. By adopting the technical solution provided by the example, the optimization handling may be performed on at least one process, based on the feature information identified by the process category matching with each process of the at least one process. Thus, the deficiencies in the prior art may be effectively made up. That is, no optimization handling may be performed on multiple processes, during the procedure of a terminal simultaneously executing the multiple processes, and when the terminal handles the tasks corresponding to the multiple processes, handling efficiency of the terminal may be lower. Thus, the terminal handling efficiency may be effectively improved, and usage experience of the terminal user may be enhanced. For example, in accordance with the technical solution of the example, during the process of a user utilizing a computer to browse a webpage or view an online video, when security category software starts to be updated or starts to scan, and so on, since a large number of computer resources need to be consumed by updating or scanning executed by the security category software, which will affect webpage browsing, or online video viewing, or other tasks executed by the computer. By adopting the technical solution of the example, an optimization handling may be performed on processes. For example, when a user utilizes a computer to browse a webpage or view an online video, operations executed by the security category software, such as updating or scanning, may be stopped. Subsequently, when the computer handles the webpage browsing or the online video viewing of the user, efficiency of the computer may be guaranteed. When browsing the webpage or viewing the online video, experience of the computer user may also be enhanced.

Optionally, on the basis of the example illustrated with FIG. 1, the block 100 "determine at least one process being executed" in the foregoing example may include the follows. Determine dimension information of each process in the at least one process being executed. That is, in the example, the dimension information employed may include at least one of bandwidth occupancy rate, processor occupancy rate, memory occupancy rate, mouse click frequency, keyboard hit frequency and full screen or not. The mouse click frequency and keyboard hit frequency may be represented by an average mouse click rate and an average keyboard hit rate per unit time.

Furthermore, optionally, the default category process in the foregoing example may also be identified by the dimension information of the default category process. The dimension information may also include at least one of the bandwidth occupancy rate, the processor occupancy rate, the memory occupancy rate, the mouse click frequency, the keyboard hit frequency and full screen or not.

It should be noted that, the default process category list may be downloaded by a device for handling an optimization process from a cloud server. In the technical solution, the cloud server may manage the default process category list.

At this time, the corresponding block 101 "identify the default category process matching with each process in the at least one process, based on the default process category list" may include the following blocks.

(1) For each process in the at least one process, calculate an Euclidean distance between the process and the default category process.

In the example, when the default category process in the default process category list and each process in the at least one process are respectively represented by a vector, e.g., the process and the default category process may be represented by $X=(x_1, x_2, x_3, x_4, x_5, x_6)$, in which $x_1, x_2, x_3, x_4, x_5, x_6$ may represent dimensions of the process, such as the bandwidth occupancy rate, processor occupancy rate, memory occupancy rate, mouse click frequency, keyboard hit frequency, full screen or not, and so on. For example, three dimensions, such as the bandwidth occupancy rate, processor occupancy rate and memory occupancy rate, may be configured as having three levels, i.e., high, intermediate and low, respectively represented by 3, 2 and 1, based on practical requirements. "3" may represent the highest bandwidth occupancy rate, or the highest processor occupancy rate, or the highest memory occupancy rate. "1" may represent the lowest bandwidth occupancy rate, or the lowest processor occupancy rate, or the lowest memory occupancy rate. The two dimensions, such as mouse click frequency and keyboard hit frequency, may be respectively configured as having two levels, i.e., high and low, based on practical requirements. For example, "2" may represent high mouse click frequency and high keyboard hit frequency. "1" may represent low mouse click frequency and low keyboard hit frequency. Full screen may be represented by "1". Not full screen may be represented by "0".

(2) Determine whether the Euclidean distance between the process and the default category process is smaller than or equal to a preset threshold; when determining that the Euclidean distance between the process and the default category process is smaller than or equal to the preset threshold, proceed with (3); otherwise, when determining that the Euclidean distance between the process and the default category process is larger than the preset threshold, proceed with (4).

It should be noted that, in practical applications, the method may rely on parameters, such as a parameter indicating resources occupied by detected processes. However, an existing problem may be as follows. Detected state about resources occupied by a process at a certain time point may be not the normal state. For example, during the process of playing a High Definition (HD) video, when a user clicks the "pause" button, the system resources consumed by the playing program detected at this time point is low, which is obviously inconsistent with the practical conditions. At this time, a method for detecting multiple times may be employed, to calculate the Euclidean distance between the process detected for multiple times and the default category process, and take an average value of multiple-time detection (such as 100-time detection) as the Euclidean distance between the process and the default category process. By employing the method for detecting multiple times, vector value about each process category may be closer to a user's actual conditions, and the detection may be more accurate.

(3) Determine that the process matches with the default category process.

(4) Add the process to the default process category list, and take the process as a newly added default category process.

In the technical solution provided by block (4), the device for handling the optimization process may locally manage the default process category list.

In the example, when the Euclidean distance between the process and the default category process is smaller than or equal to the preset threshold, it means that the process and the default category process belong to the same category, at this time, it may be determined that the process matches with the default category process. Otherwise, when the Euclidean distance between the process and all of the default category processes in the default process category list is larger than the preset threshold, at this time, the process and all of the default category processes in the default process category list may not belong to the same category. That is, it may be determined that the process doesn't match with each default category process in the default process category list. At this time, the process may be taken as a newly added default category process and added to the default process category list.

For example, regarding two vectors of $X=(x_1, x_2 \ldots x_n)$ and $Y=(y_1, y_2 \ldots y_n)$, the Euclidean distance between them may be represented by $$d(X, Y) = \sqrt{(x_1 - y_1)^2 + (x_2 - y_2)^2 + \ldots + (x_n - y_n)^2} = \sqrt{\sum_{i=1}^{n}(x_i - y_i)^2}.$$

By adopting the foregoing representation, one process to download an application may be represented with the following vector, $X_{download}=(3,1,2,1,1,0)$. In the default process category list, an default category process for an application with a downloading type may be represented by $X_{bandwidth}=(3,1,1,1,1,0)$. By employing the foregoing formula for calculating the Euclidean distance, when the calculated value of the Euclidean distance about these two vectors is smaller than a preset value, it may be determined that these two vectors belong to the same category. For example, after calculating the Euclidean distance between the foregoing $X_{download}$ and $X_{bandwidth}$, obtained result is 1, so that the process to download a service may be considered as belonging to the process for the application with a downloading type.

After executing the foregoing block (4), the method may further include the follows: upload the process to a cloud server, such that the cloud server may add the process to the default process category list, and take the process as a newly added default category process. Similarly, in the technical solution, the cloud server may manage the default process category list.

It should be noted that, the feature information of the default category process may be determined by the dimension information of the default category process. For example, category processes may be distinguished by different applications. The following processes may be included based on applications.

(a) Processes of a large-scale game, based on the dimension information of a process in this category, the feature information of an application in this category may be learned as follows: small bandwidth, a large number of consumed resources, not appropriate to be executed simultaneously with other tasks with a large consumption of resources (such as Trojan scanning) and procedures for interrupting the game (that is, with a pop-up prompt window).

(b) Processes of online video and downloading software category: based on the dimension information of a process in this category, the feature information of an application in this category may be learned as follows: large bandwidth, intermediate consumption of resources, not appropriate to be executed simultaneously with other tasks with a consumption of bandwidth (such as downloading and updating).

(c) Processes of HD video category: based on the dimension information of a process in this category, the feature information of an application in this category may be learned as follows: small bandwidth, a large consumption of resources, not appropriate to be executed simultaneously with other tasks with a large consumption of resources (such as Trojan scanning).

(d) Processes of a general category application, including webpage browsing, document handling: based on the dimension information of a process in this category, the feature information of an application in this category may be learned as follows: small bandwidth, a small consumption of resources, generally compatible with processes of other applications, that is, the processes of other applications may be executed simultaneously.

Optionally, based on the technical solution provided by the foregoing example, specifically speaking, block 102 "perform an optimization handling on the at least one process, based on the feature information of the default category process matching with each process in the at least one process" may include the following blocks.

(A) Determine mutual compatibility of the at least one process, based on the feature information of the default category process matching with each process in the at least one process.

For example, the feature information of the default category process may refer to bandwidth occupied by the default category process, resources consumed by the default category process, and so on. Based on the feature information about each default category process, the compatibility among each process may be determined. Alternatively, the feature information of a default category process may directly include the compatibility between the default category process and other processes.

(B) Perform the optimization handling on the at least one process, based on the mutual compatibility of the at least one process and priority of each process in the at least one process.

For example, according to the feature information of foregoing four kinds of processes (a)-(d) distinguished by service types, compatibility among each process may be obtained. And then, the optimization process may be performed on the at least one process, based on the compatibility of processes and priority of each process. For example, select a process with the highest priority, turn off other processes not compatible with the process of the highest priority, and keep processes compatible with the process of the highest priority. Thus, the optimization handling on the at least one process may be implemented.

All of the foregoing optional technical solutions may be randomly combined with any available combination mode, to form an optional example of the present disclosure, which will not be repeated here.

By adopting the technical solution provided by the foregoing example, the optimization handling may be performed on the at least one process, based on the feature information identified by the process category matching with each process in the at least one process. Thus, the deficiencies in the prior art may be made up effectively. That is, in the prior art, when multiple processes are executed simultaneously by a terminal, no optimization handling may be performed on the multiple processes; subsequently, handling efficiency of tasks corresponding to the multiple processes executed by the terminal may be lower. And then, the terminal handling efficiency may be improved effectively, and usage experience of the terminal user may also be enhanced. For example, by employing the technical solution of foregoing example, during the process of a user utilizing a computer to browse a webpage or view an online video, when security category software starts to be updated or starts to scan, and so on, since a large number of computer resources may be consumed by the updating or virus scanning executed by the security category software, which will affect webpage browsing, or online video viewing, or other tasks executed by the computer. By employing the technical solution of foregoing example, the optimization process may be performed on processes. For example, when a user utilizes a computer to browse a webpage or view an online video, stop the operations of updating or scanning executed by the security category software, so as to guarantee the efficiency of the computer, when the computer handles the webpage browsing or online video viewing executed by a user. And when browsing the webpage, or viewing the online video, experience of the computer user may also be enhanced.

A Second Example

Figure 2:
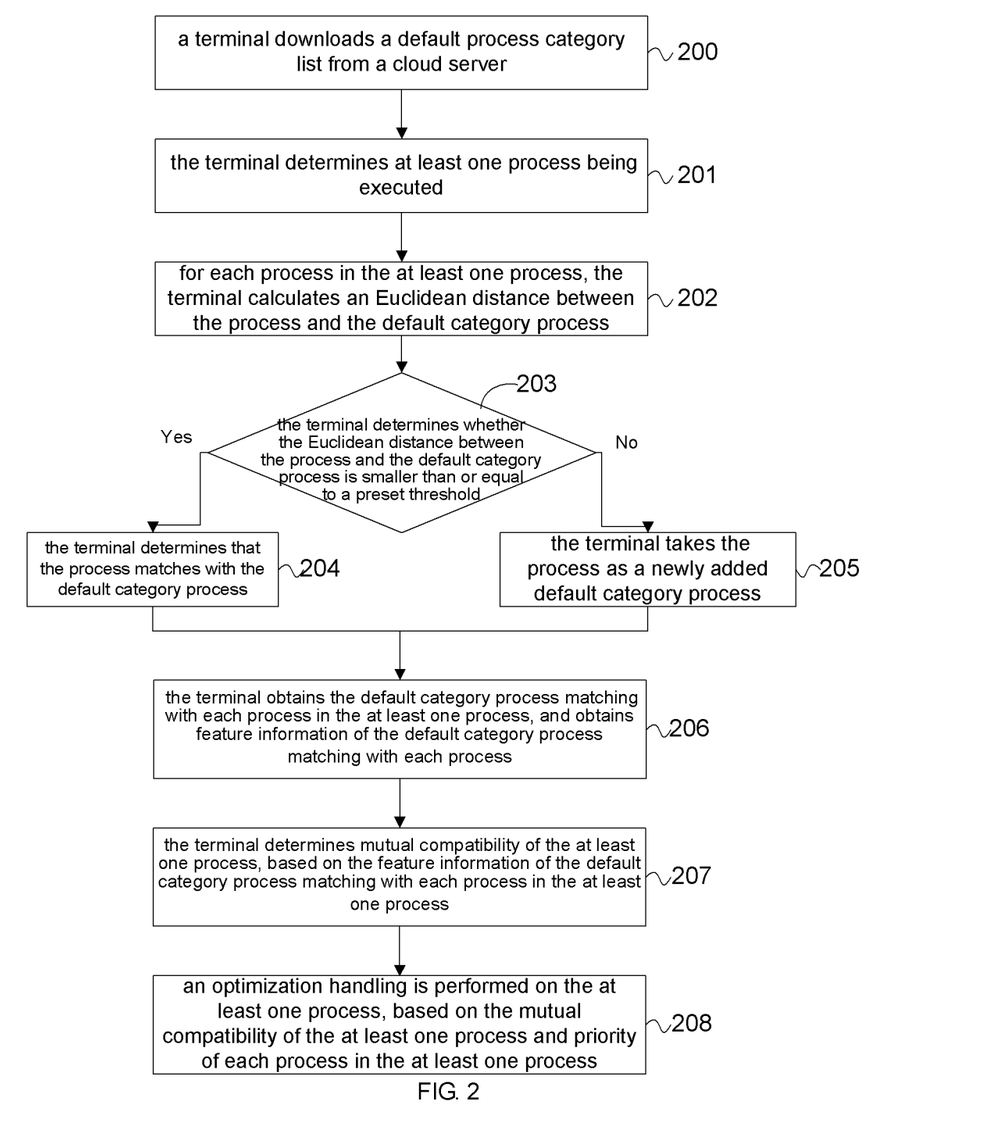
FIG. 2 is a flowchart illustrating a method for handling an optimization process, in accordance with a second example of the present disclosure.

FIG. 2 is a flowchart illustrating a method for handling an optimization process, in accordance with the second example of the present disclosure. A device for handling an optimization process may be taken as an example. An optional example may be provided on the basis of the foregoing example. As shown in FIG. 2, the method for handling the optimization process in the example may include the following blocks.

In block 200, a terminal may download a default process category list from a cloud server.

The default process category list may include a default category process, e.g., one default category process, or two or more default category processes. Each default category process may be represented by dimension information, and the dimension information may include at least one of bandwidth occupancy rate, processor occupancy rate, memory occupancy rate, mouse click frequency, keyboard hit frequency, and full screen or not.

In block 201, the terminal may determine at least one process being executed.

Each process may be represented by at least one kind of dimension information, such as the bandwidth occupancy rate, the processor occupancy rate, the memory occupancy rate, the mouse click frequency, the keyboard hit frequency and full screen or not.

For example, when the at least one process being executed by the terminal includes processes, such as webpage browsing, HD video viewing, software downloading, Trojan scanning. The process corresponding to webpage browsing may consume fewer resources, and occupy smaller bandwidth, which may generally be compatible with processes of other applications. The process of HD video viewing may consume a large number of resources, occupy bigger bandwidth, and may not be appropriate to be executed simultaneously with other tasks consuming a large number of resources (such as Trojan scanning). The process corresponding to software downloading may occupy big bandwidth, consume intermediate resources, and may not be appropriate to be executed simultaneously with other tasks consuming bandwidth. The process of Trojan scanning may consume a large number of resources, and occupy small bandwidth.

In block 202, for each process in the at least one process, the terminal may calculate the Euclidean distance between the process and the default category process.

In block 203, the terminal may determine whether the Euclidean distance between the process and the default category process is smaller than or equal to a preset threshold. When the Euclidean distance between the process and the default category process is smaller than or equal to the preset threshold, proceed with block 204; otherwise, proceed with block 205.

When implementing the block, specifically speaking, it may be understood to determine whether the Euclidean distance between the process and each default category process in the default process category list is smaller than or equal to the preset threshold. Only if the Euclidean distance between the process and one default category process is smaller than or equal to the preset threshold, it may be determined that the process matches with the default category process. Otherwise, when the Euclidean distance between the process and any default category process in the default process category list is larger than the preset threshold, it may be determined that the process doesn't match with the default category process, thus, proceed with block 204 or 205.

In block 204, the terminal may determine that the process matches with the default category process, and proceed with block 206.

In block 205, the terminal may take the process as a newly added default category process, and proceed with block 206.

At this time, the process may match with the newly added default category process (that is, the process itself).

Optionally, after block 205, the following may be further included. The terminal may upload the process to the cloud server, such that the cloud server may add the process to the default process category list, and take the process as a newly added default category process.

In block 206, the terminal may obtain the identifier of the default category process matching with each process in the at least one process, obtain the feature information of the default category process matching with each process, and proceed with block 207.

In block 207, the terminal may determine the mutual compatibility of the at least one process, based on the feature information of the default category process matching with each process in the at least one process, and proceed with block 208.

For example, specifically speaking, the feature information may include the compatibility among processes, e.g., the process of the HD video isn't compatible with the process of Trojan scanning.

In block 208, perform the optimization handling on the at least one process, based on the mutual compatibility of the at least one process and priority of each process in the at least one process.

For example, when the priority of the process about the HD video is higher than that about the Trojan scanning, it may firstly turn off the process about the Trojan scanning, and keep the process about the HD video, so as to prevent the terminal from simultaneously executing two tasks each with a large consumption of resources, and guarantee efficiency of the terminal when handling tasks.

By adopting the method for handling the optimization process provided by the foregoing example, the optimization handling may be performed on the at least one process, based on the feature information identified by the process category matching with each process in the at least one process. Thus, the deficiencies in the prior art may be made up effectively. The deficiencies in the prior art refer to as follows. When multiple processes are executed simultaneously by a terminal, no optimization handling may be performed on the multiple processes. Subsequently, handling efficiency of tasks corresponding to the multiple processes executed by the terminal may be lower. And then, the terminal handling efficiency may be improved effectively, and usage experience of the terminal user may also be enhanced. For example, during the process of a user utilizing a computer to browse a webpage or view an online video, when security category software starts to be updated or starts to scan, and so on, since a large number of computer resources may be consumed by the updating or virus scanning executed by the security category software, which will affect webpage browsing, or online video viewing, or other tasks executed by the computer. By employing the technical solution of foregoing example, the optimization handling may be performed on processes. For example, when a user utilizes a computer to browse a webpage or view an online video, stop the operations of updating or scanning executed by the security software, so as to guarantee the efficiency of the computer, when the computer handles the webpage browsing or online video viewing executed by a user. And when browsing the webpage, or viewing the online video, experience of the computer user may also be enhanced.

A Third Example

Figure 3:
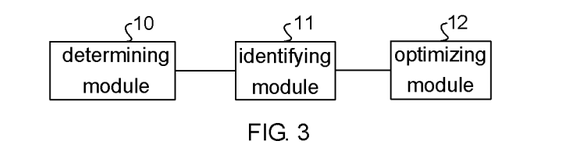
FIG. 3 is a schematic diagram illustrating structure of a device for handling an optimization process, in accordance with a third example of the present disclosure.

FIG. 3 is a schematic diagram illustrating structure of a device for handling an optimization process, in accordance with the third example of the present disclosure. As shown in FIG. 3, the device for handling the optimization process provided by the example may specifically include a determining module 10, an identifying module 11 and an optimizing module 12.

The determining module 10 is to determine at least one process being executed. The identifying module 11 connects with the determining module 10. The identifying module 11 is to identify a default category process matching with each process in the at least one process, which is determined by the determining module 10, based on a default process category list. The default process category list may include a default category process and feature information of the default category process. The optimizing module 12 connects with the identifying module 11. The optimizing module 12 is to perform an optimization handling on the at least one process, based on the feature information of the default category process matching with each process in the at least one process, in which the default category process is identified by the identifying module 11.

The device for handling the optimization process provided by the example may employ the foregoing modules to handle the optimization process. The implementation mechanism is the same as that of the foregoing related method example. Please refer to descriptions about foregoing related method example, which will not be repeated here.

The device for handling the optimization process provided by the example may employ the foregoing modules to implement the following operations. Determine at least one process being executed; identify a default category process matching with each process in the at least one process, based on a default process category list; in which the default process category list may include a default category process and feature information of the default category process; perform an optimization handling on the at least one process, based on the feature information of the default category process matching with each process in the at least one process. By adopting the technical solution of the example, the optimization handling may be performed on the at least one process, based on the feature information identified by the process category matching with each process in the at least one process. Thus, the deficiencies in the prior art may be made up effectively. The deficiencies in the prior art may refer to the following. When multiple processes are executed simultaneously by a terminal, no optimization handling may be performed on the multiple processes. Subsequently, handling efficiency of tasks corresponding to the multiple processes executed by the terminal may be lower. By adopting the technical solution of the example, the terminal handling efficiency may be improved effectively, and usage experience of the terminal user may also be enhanced. For example, by employing the technical solution of foregoing example, during the process of a user utilizing a computer to browse a webpage or view an online video, when security category software starts to be updated or starts to scan, and so on, since a large number of computer resources may be consumed by the updating or virus scanning executed by the security category software, which will affect webpage browsing, or online video viewing, or other tasks executed by the computer. By employing the technical solution of foregoing example, the optimization handling may be performed on processes. For example, when a user utilizes a computer to browse a webpage or view an online video, stop the operations of updating or scanning executed by the security category software, so as to guarantee the efficiency of the computer, when the computer handles the webpage browsing or online video viewing executed by a user. And when browsing the webpage, or viewing the online video, experience of the computer user may also be enhanced.

A Fourth Example

Figure 4:
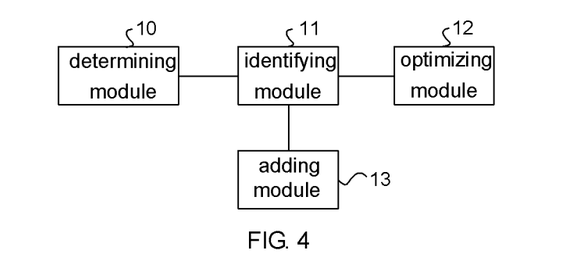
FIG. 4 is a schematic diagram illustrating structure of a device for handling an optimization process, in accordance with a fourth example of the present disclosure.

FIG. 4 is a schematic diagram illustrating structure of a device for handling an optimization process, in accordance with the fourth example of the present disclosure. As shown in FIG. 4, based on the example illustrated with FIG. 3, the device for handling the optimization process in the example may further include the follows.

The determining module 10 is to determine dimension information of each process in the at least one process being executed. The dimension information may include at least one of bandwidth occupancy rate, processor occupancy rate, memory occupancy rate, mouse click frequency, keyboard hit frequency and full screen or not.

Specifically speaking, when the default category process is identified by the dimension information of the default category process, the default category process in the default process category list and each process in the at least one process are respectively represented by a vector. For each process in the at least one process determined by the determining module 10, the identifying module 11 is to calculate the Euclidean distance between the process and default category process, and determine whether the Euclidean distance between the process and the default category process is smaller than or equal to a preset threshold. When determining that the Euclidean distance between the process and the default category process is smaller than or equal to the preset threshold, the identifying module 11 may determine that the process matches with the default category process.

As shown in FIG. 4, optionally, the device for handling the optimization process in the example may further include an adding module 13. The adding module 13 may connect with the identifying module 11. When the identifying module 11 determines that the Euclidean distance between the process and the default category process is larger than the preset threshold, the adding module 13 is to add the process to the default process category list, and take the process as a newly added default category process. At this time, the device for handling the optimization process may locally manage the default process category list. When the cloud server is in charge of managing the default process category list, the device for handling the optimization process may also include an uploading module, which is to upload the process to the cloud server, such that the cloud server may add the process to the default process category list, and take the process as a newly added default category process.

Furthermore, optionally, in the device for handling the optimization process provided by the example, specifically speaking, the optimizing module 12 may determine mutual compatibility of the at least one process, based on the feature information of the default category process matching with each process in the at least one process, and perform an optimization handling on the at least one process, based on the mutual compatibility of the at least one process and the priority of each process in the at least one process.

Furthermore, optionally, in the foregoing example, the feature information of the default category process may be determined by the dimension information of the default category process.

All of the foregoing optional technical solutions may be randomly combined with an available combination mode, to form an optional example of the present disclosure, which will not be repeated here.

The device for handling the optimization process provided by the example may employ the foregoing modules to perform the handling on the optimization process. The implementation mechanism is the same as the foregoing related method example. Please refer to descriptions of foregoing related method example, which will not be repeated here.

The device for handling the optimization process provided by the example may employ the foregoing modules, to perform the optimization handling on the at least one process, based on the feature information identified by the process category matching with each process in the at least one process. Thus, the deficiencies in the prior art may be made up effectively. The deficiencies in the prior art refer to as follows. When multiple processes are executed simultaneously by a terminal, no optimization handling may be performed on the multiple processes. Subsequently, handling efficiency of tasks corresponding to the multiple processes executed by the terminal may be lower. By employing the device provided by the example, the terminal handling efficiency may be improved effectively, and usage experience of the terminal user may also be enhanced. For example, during the process of a user utilizing a computer to browse a webpage or view an online video, when security category software starts to be updated or starts to scan, and so on, since a large number of computer resources may be consumed by the updating or virus scanning executed by the security category software, which will affect webpage browsing, or online video viewing, or other tasks executed by the computer. By employing the technical solution of foregoing example, the optimization handling may be performed on processes. For example, when a user utilizes a computer to browse a webpage or view an online video, stop the operations of updating or scanning executed by the security category software, so as to guarantee the efficiency of the computer, when the computer handles the webpage browsing or online video viewing executed by a user. And when browsing the webpage, or viewing the online video, experience of the computer user may also be enhanced.

The device for handling the optimization process in the foregoing example may be set in a terminal side, when implementing.

It should be noted that, when performing the handling on an optimization process in accordance with the technical solution provided by the foregoing example, an example about divisions of each functional module is provided for descriptions. In practical applications, the foregoing functions may be allocated for different functional modules to complete, based on requirements. That is, the internal structure of the device may be divided into different functional modules, so as to complete all of or part of functions described above. In addition, the device and method for handling the optimization process provided by the foregoing examples belong to the same ideas. The specific implementation process of the device may refer to the foregoing method example, which will not be repeated here.

A Fifth Example

Figure 5:
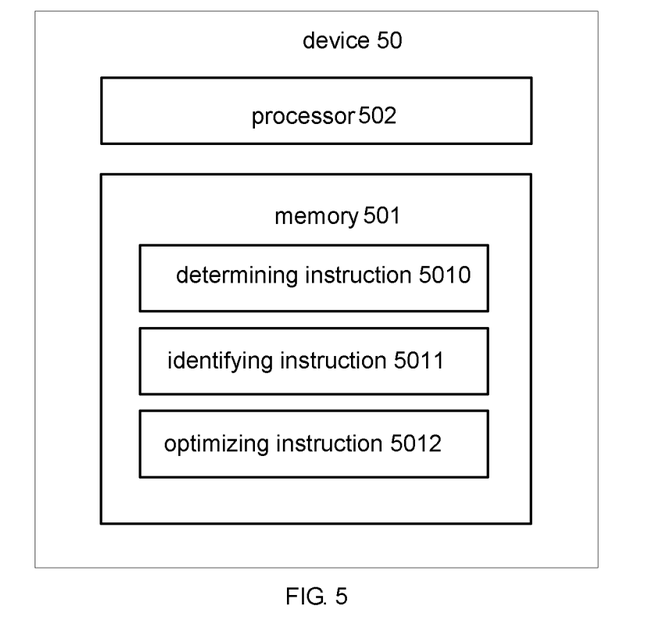
FIG. 5 is a schematic diagram illustrating structure of a device for handling an optimization process, in accordance with a fifth example of the present disclosure.

FIG. 5 is a schematic diagram illustrating structure of a device for handling an optimization process, in accordance with the fifth example of the present disclosure. As shown in FIG. 5, the device 50 for handling the optimization process may include a memory 501, a processor 502 in communication with the memory 501. The memory 501 may store a determining instruction 5010, an identifying instruction 5011 and an optimizing instruction 5012, which are executable by the processor 502.

The determining instruction 5010 indicates to determine at least one process being executed. Based on a default process category list, the identifying instruction 5011 indicates to identify a default category process matching with each process in the at least one process, which is determined based on the determining instruction 5010. The default process category list may include a default category process and feature information of the default category process. The optimizing instruction 5012 indicates to perform an optimization handling on the at least one process, based on the feature information of the default category process matching with each process in the at least one process, in which the default category process is identified based on the identifying instruction 5011.

The implementation mechanism of the device provided by the example is the same as that of the foregoing related method example. Please refer to descriptions about foregoing related method example, which will not be repeated here.

A Sixth Example

Figure 6:
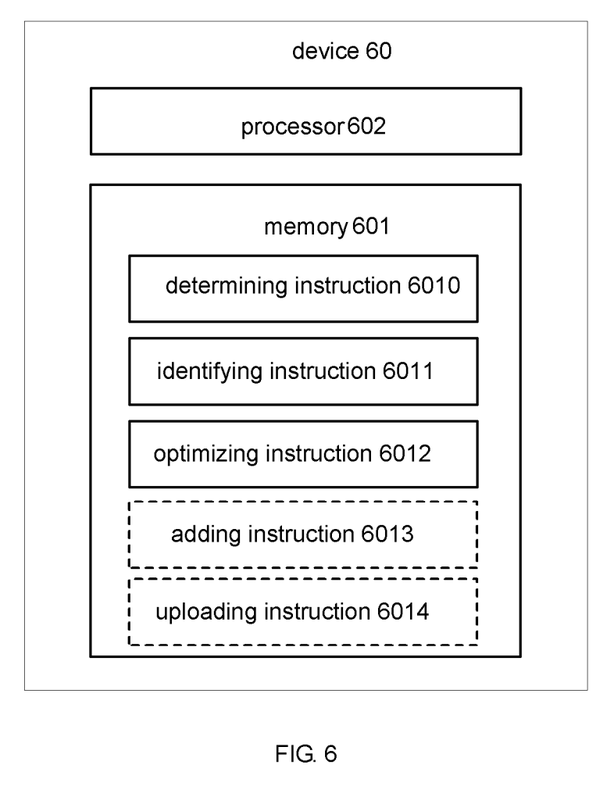
FIG. 6 is a schematic diagram illustrating structure of a device for handling an optimization process, in accordance with a sixth example of the present disclosure.

FIG. 6 is a schematic diagram illustrating structure of a device for handling an optimization process, in accordance with the sixth example of the present disclosure. As shown in FIG. 6, the device 60 for handling the optimization process may include a memory 601 and a processor 602 in communication with the memory 601. The memory 601 may store a determining instruction 6010, an identifying instruction 6011, and an optimizing instruction 6012, which are executable by the processor 602. When being executed, functions of the determining instruction 6010, the identifying instruction 6011 and the optimizing instruction 6012 are similar to that of the determining instruction 5010, the identifying instruction 5011 and the optimizing instruction 5012 in the fifth example.

The determining instruction 6010 further indicates to determine dimension information of each process in the at least one process being executed. The dimension information may include at least one of bandwidth occupancy rate, processor occupancy rate, memory occupancy rate, mouse click frequency, keyboard hit frequency and full screen or not.

Specifically speaking, when the default category process is identified by the dimension information of the default category process, the default category process in the default process category list and each process in the at least one process are respectively represented by a vector, for each process in the at least one process determined based on the determining instruction 6010. The identifying instruction 6011 indicates to calculate the Euclidean distance between the process and default category process, and determine whether the Euclidean distance between the process and the default category process is smaller than or equal to a preset threshold. When determining that the Euclidean distance between the process and the default category process is smaller than or equal to the preset threshold, the identifying instruction 6011 may indicate to determine that the process matches with the default category process.

As shown in FIG. 6, the memory 601 may further include an adding instruction 6013 executable by the processor 602. When determining that the Euclidean distance between the process and the default category process is larger than the preset threshold based on the identifying instruction 6011, the adding instruction 6013 indicates to add the process to the default process category list, and take the process as a newly added default category process. At this time, the device for handling the optimization process may locally manage the default process category list. When the cloud server is in charge of managing the default process category list, the memory 601 may further include an uploading instruction 6014 executable by the processor 602. The uploading instruction 6014 may indicate to upload the process to the cloud server, such that the cloud server may add the process to the default process category list, and take the process as a newly added default category process.

Furthermore, the optimizing instruction 6012 may indicate to determine mutual compatibility of the at least one process, based on the feature information of the default category process matching with each process in the at least one process, and perform the optimization handling on the at least one process, based on the mutual compatibility of the at least one process and the priority of each process in the at least one process.

By adopting the device of the foregoing examples, the optimization handling may be performed on the at least one process, based on the feature information identified by the process category matching with each process in the at least one process. Thus, the deficiencies in the prior art may be made up effectively. The deficiencies in the prior art may refer to the following. When multiple processes are executed simultaneously by a terminal, no optimization handling may be performed on the multiple processes. Subsequently, handling efficiency of tasks corresponding to the multiple processes executed by the terminal may be lower.

The example number of the present disclosure is provided for descriptions, which doesn't represent better example or good example.

Persons having ordinary skill in the art may learn that, all of or part of blocks in the foregoing examples may be implemented with hardware, or may be implemented by related hardware instructed by a program. The program may be stored in a computer readable storage medium. The foregoing storage medium may be Read-Only Memory (ROM), disk, Compact Disc (CD), and so on.

The foregoing is only preferred examples of the present disclosure, which is not used for limiting the present disclosure. Any modifications, equivalent substitutions or improvements made within the spirit and principle of the present disclosure, should be covered by the protection scope of the present disclosure.

What is claimed is:

1. A method for performing optimization handling on a process, comprising:
   determining at least one process being executed;
   identifying a default category process that matches with each process in the at least one process, based on a default process category list, wherein the default process category list comprises at least one default category process and feature information of each default category process;
   performing optimization handling on the at least one process, based on the feature information of the identified default category process;
   wherein determining the at least one process being executed comprises: determining dimension information of each process in the at least one process being executed, wherein the dimension information comprises at least one of a bandwidth occupancy rate, a processor occupancy rate, a memory occupancy rate, a mouse click frequency, a keyboard hit frequency, and full screen or not;
wherein the default category process is identified by the dimension information of the default category process, and wherein identifying the default category process that matches with each process in the at least one process, based on the default process category list, comprises:
when the default category process in the default process category list and each process in the at least one process are respectively represented by a vector, regarding each process in the at least one process, calculating an Euclidean distance between the process and the default category process;
determining whether the Euclidean distance between the process and the default category process is smaller than or equal to a preset threshold,
wherein based on determining that the Euclidean distance between the process and the default category process is smaller than or equal to the preset threshold, the process matches with the default category process;
wherein the feature information of the identified default category process is determined by the dimension information of the identified default category process.

2. The method according to claim 1, wherein when the Euclidean distance between the process and the default category process is larger than the preset threshold, the method further comprises:
adding the process to the default process category list as a newly added default category process.

3. The method according to claim 2, further comprising:
uploading the process to a cloud server, so that the cloud server adds the process to the default process category list as the newly added default category process.

4. The method according to claim 1, wherein performing the optimization handling on the at least one process, based on the feature information of the identified default category process, comprises:
determining mutual compatibility between each process and other processes in the at least one process, based on the feature information of the identified default category process; and
performing the optimization handling on the at least one process, based on the determined mutual compatibility and priority of each process in the at least one process.

5. A device for performing optimization handling on a process, comprising a memory and a processor communicating with the memory, the memory being configured to store instructions that when executed by the processor cause the device to:
determine at least one process being executed;
identify a default category process that matches with each process in the at least one process, based on a default process category list, wherein the default process category list comprises at least one default category process and feature information of each default category process; and
perform optimization handling on the at least one process, based on the feature information of the identified default category process;
determine dimension information of each process in the at least one process being executed, wherein the dimension information comprises at least one of a bandwidth occupancy rate, a processor occupancy rate, a memory occupancy rate, a mouse click frequency, a keyboard hit frequency and full screen or not;
wherein the default category process is identified by the dimension information of the default category process, and wherein the instructions that cause the device to identify the default category list comprise instructions that cause the processor to:
when the default category process in the default process category list and each process in the at least one process are represented respectively with a vector, regarding each process in the at least one process, calculate an Euclidean distance between the process and the default category process,
determine whether the Euclidean distance between the process and the default category process is smaller than or equal to a preset threshold,
wherein based on determining that the Euclidean distance between the process and the default category process is smaller than or equal to the preset threshold, the process matches with the default category process;
wherein the feature information of the identified default category process is determined by the dimension information of the identified default category process.

6. The device according to claim 5, wherein the instructions when executed by the processor further cause the device to: add the process to the default process category list as a newly added default category process, when the Euclidean distance between the process and the default category process is larger than the preset threshold.

7. The device according to claim 6, wherein the instructions when executed by the processor further cause the device to: upload the process to a cloud server, so that the cloud server adds the process to the default process category list as the newly added default category process.

8. The device according to claim 5, wherein the instructions when executed by the processor further cause the device to: determine mutual compatibility between each process and other processes in the at least one process, based on the feature information of the identified default category process, and perform the optimization handling on the at least one process, based on the determined mutual compatibility and priority of each process in the at least one process.

* * * * *